United States Patent
Tezuka et al.

(10) Patent No.: US 6,721,556 B2
(45) Date of Patent: Apr. 13, 2004

(54) RADIO COMMUNICATION APPARATUS AND RADIO COMMUNICATION METHOD

(75) Inventors: Fumiyoshi Tezuka, Ome (JP); Toshiki Miyasaka, Urawa (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 457 days.

(21) Appl. No.: 09/783,302

(22) Filed: Feb. 15, 2001

(65) Prior Publication Data

US 2001/0018338 A1 Aug. 30, 2001

(30) Foreign Application Priority Data

Feb. 18, 2000 (JP) ........................................ 2000-041637

(51) Int. Cl.[7] .............................. H04Q 7/32; H04Q 7/20
(52) U.S. Cl. ...................... 455/411; 455/410; 455/411; 455/422.1; 455/575.1; 455/575.7; 455/403; 343/702; 343/718; 379/433.01; 379/433.05; 379/447
(58) Field of Search ............................ 455/410, 411, 455/403, 575.1, 575.7, 90.1, 90.3, 517, 347, 348; 343/702, 718, 575.1, 575.7, 550.1; 379/433.01, 428.01, 433.05, 433.11, 447, 422.1, 347

(56) References Cited

U.S. PATENT DOCUMENTS 5,033,109 A * 7/1991 Kawano et al. ............ 455/90.1
5,963,144 A * 10/1999 Kruest ....................... 455/90.1

FOREIGN PATENT DOCUMENTS

JP          411055158 A   *  2/1999

* cited by examiner

*Primary Examiner*—William Trost
*Assistant Examiner*—Keith Ferguson
(74) *Attorney, Agent, or Firm*—Finnegan, Henderson, Farabow, Garrett & Dunner, L.L.P.

(57) ABSTRACT

A radio communication apparatus for performing the authentication processing with another apparatus via radio communication, comprises an antenna section composed to be detachably fitted to the apparatus, a connection section for detecting the detachment of the antenna section, and a control section for performing the authentication processing upon the detection of detachment of the antenna section by the connection section. Electric wave release and reception efficiency can be attenuated considerably, and the authentication information is prevented from arriving at an unspecified other party, as the control section passes to the authentication processing in connection with the detachment of the antenna section from the apparatus, and the antenna section is already detached when the authentication processing starts.

4 Claims, 5 Drawing Sheets

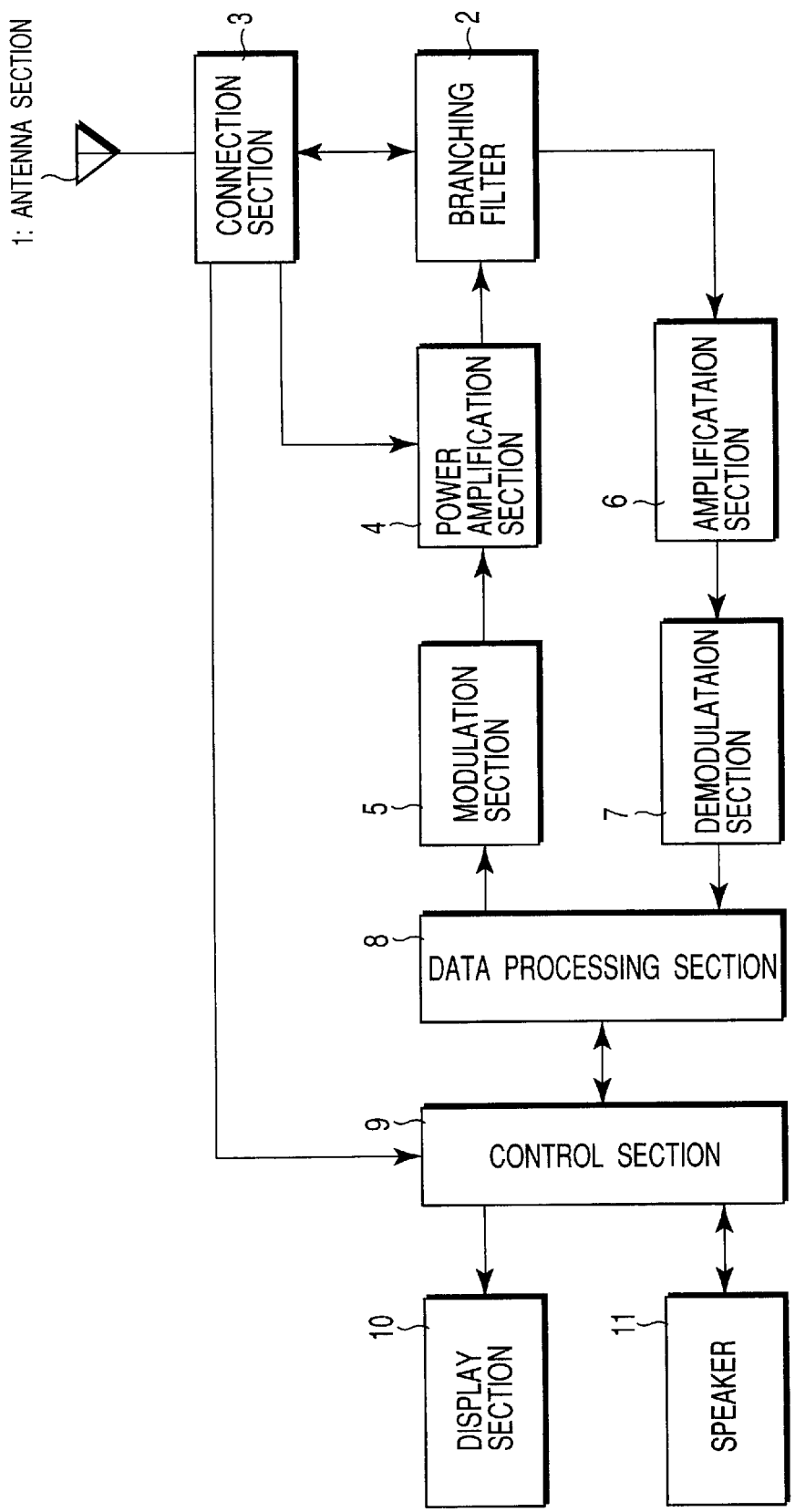
F I G. 1

RADIO COMMUNICATION APPARATUS AND RADIO COMMUNICATION METHOD

CROSS-REFERENCE TO RELATED APPLICATIONS

This application is based upon and claims the benefit of priority from the prior Japanese Patent Application No. 2000-041637, filed Feb. 18, 2000, the entire contents of which are incorporated herein by reference.

BACKGROUND OF THE INVENTION

The present invention relates to a radio communication apparatus for performing authentication processing with the other apparatus via radio communication, and radio communication method.

In recent years, a wireless connection among radio communication apparatuses has been proposed by applying a communication method for performing data communication by constituting a radio communication network with a single parent apparatus and a plurality of child apparatuses, to the radio communication apparatus interface. In such communication method, usually, any radio communication apparatuses having a similar communication method can be connected each other, and the communication can be established with radio communication apparatuses within a distance range (for instance within a radius of 10 m) corresponding to their radio communication capability.

On the other hand, in case of an application to a personal computer and radio communication apparatuses functioning as its peripheral equipment, sometimes it is desirable to connect only to radio communication apparatuses within a limited range. For example, it is the case when a personal computer on one desktop is desired to be connected limitedly to peripheral equipment used by this computer, and not connected to remote computers or peripheral equipment used by the other.

By the way, for the initial connection for communicating by radio communication, an authentication processing is performed among radio communication apparatuses to communicate, in order to prevent a third party from intercepting communication data. In the authentication processing, inherent information (authentication information) is transmitted and received among radio communication apparatuses by radio communication, and once the other apparatus is authenticated by this authentication processing, thereafter, data communication is performed between both parties by a method for preventing communication contents from being leaked outside.

Thus, in the conventional communication method, the authentication information is transmitted and received among radio communication apparatuses in the authentication processing; however, if a radio communication apparatus to be connected and radio communication apparatuses not to be connected exist in the proximity area (radio electric wave range), the inherent information for authentication processing may be transmitted and received among theses both radio communication apparatuses. In other words, a nonspecific other party can intercept the authentication information, and the authentication processing may be performed simultaneously by an unintended radio communication apparatus.

Considering these problems, the Applicant has applied for a method for lowering output by the control section during the authentication processing, in Jpn. Pat. Appln. KOKAI Publication No. 11-96821, "Radio communication apparatus, and its control method". Namely, only a certain radio communication apparatus can receive the authentication information, by controlling the radio output during the authentication processing.

However, though the technology of the previous Application can prevent a nonspecific other from intercepting the authentication information, it requires an additional circuit such as control circuit for radio output control, and it should be improved in that it increases costs for the radio communication apparatus.

BRIEF SUMMARY OF THE INVENTION

Consequently, it is an object of the present invention to provide a radio communication apparatus, and a radio communication method allowing to communicate by performing easily the authentication processing only with a specific other apparatus, without increasing the cost by adding a control circuit for radio output control or others.

According to a first aspect of the present invention, there is provided a radio communication apparatus for performing the authentication processing with other apparatus via radio communication, comprising:

an antenna detachably fitted to the apparatus;

detection means for detecting the detachment of the antenna; and control means for performing the authentication processing upon the detection of detachment of the antenna by the detection means.

According to a second aspect of the present invention, there is provided a radio communication apparatus for performing the authentication processing with other apparatus via radio communication, comprising:

a radio communication antenna;

a communication circuit;

a switch for switching over connection and disconnection between the radio communication antenna and the communication circuit; and control means for detecting the disconnection between the radio communication antenna and the communication circuit by the switch, and performing the authentication processing in connection with this disconnection.

According to a third aspect of the present invention, there is provided a radio communication apparatus for performing the authentication processing with another apparatus via radio communication, comprising:

a radio communication antenna;

a communication circuit;

a switch for switching over connection and disconnection between the radio communication antenna and the communication circuit;

detection means for detection connection or disconnection state between the radio communication antenna and the communication circuit by the switch at a predetermined timing; and control means for performing the authentication processing upon the detection by the detection means of disconnection between the radio communication antenna and the communication circuit by the switch.

According to a fourth aspect of the present invention, there is provided a radio communication apparatus for performing the authentication processing with another apparatus via radio communication, comprising:

a switch for designating to perform the authentication processing;

output control means for lowering the radio communication output level to a predetermined value in connection with the operation of the switch; and control means for performing the authentication processing, after the output level is lowered by the output control means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram showing the essential configuration of a radio communication apparatus according to this embodiment;

DETAILED DESCRIPTION OF THE INVENTION

Figure 2:
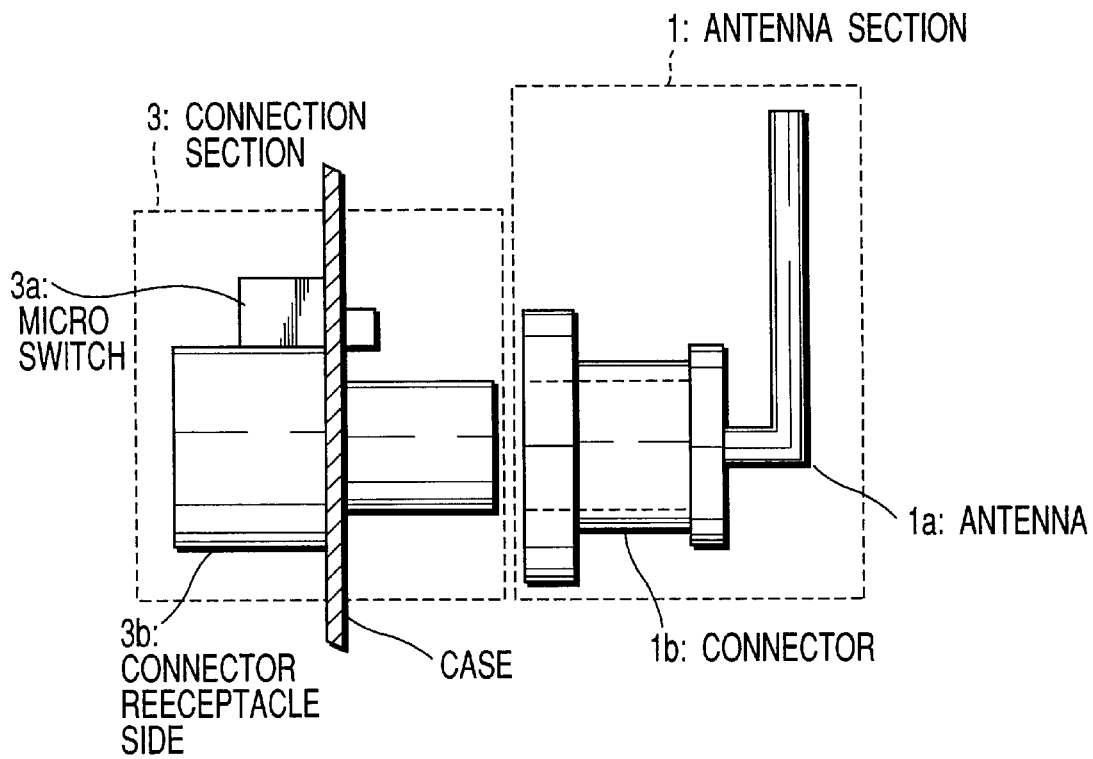
FIG. 2 shows an external view of an antenna section 1 and a connection section 3 in a first embodiment.

Now embodiments of the present invention will be described in detail referring to drawings.

FIG. 1 is a block diagram showing the essential configuration of a radio communication apparatus according to this embodiment. A radio communication apparatus can be realized by reading a program recorded in a recording medium, and using functions of a computer whose operation is controlled by this program. The radio communication apparatus is used as various information processing equipment (personal computer, PDA (personal digital assistant), or the like), communication apparatus, or the like, and can perform radio communication using, for instance, methods by Bluetooth and HomeRF. Here, Bluetooth and HomeRF are short distance radio communication standards, and using 2.4 GHz band ISM (Industry Science Medical), Bluetooth realize a radio communication of about 10 m, while HomeRF about 50 m. Bluetooth and HomeRF use frequency hopping method as spectrum diffusion technology and, at most, Bluetooth can connect eight apparatuses and HomeRF up to 127 apparatuses by time sharing multiplex system. In Bluetooth and HomeRF, apparatuses connected by the time division multiplex system form a network, and one apparatus functions as master, the others as slave. In the network, connection is certified using a code called "Link Key".

As shown in FIG. 1, the radio communication apparatus in this embodiment is composed by comprising an antenna section 1, a branching filter 2, a connection section 3, a power amplifier 4, a modulation section 5, an amplifier 6, a demodulation section 7, a data processing section 8, a control section 9, a display section 10 and a speaker section 11.

The antenna section 1 is intended to release and receive electric wave for radio communication, and connected to a communication circuit of the apparatus via the connection section 3.

The branching filter 2 inputs via the connection section 3 electric wave received by the antenna section 1, separates into electric wave of a specific frequency, and outputs to the amplifier 6.

The connection 3, in the first to third embodiments, is designed to change over the connection and disconnection between the antenna 1 and the branching filter 2. In the first embodiment, the connection section 3 is composed to detect the detachment of the antenna section 1 from the apparatus case, and inform the control section 9 of this. Besides, in the second to fourth embodiment, the connection section 3 is composed as a switch (authentication switch) to be operated to order the execution of authentication processing. In the second and third embodiments, the connection section 2 is composed to change over connection and disconnection between the antenna section 1 and the communication circuit (branching filter 2, control section 9) according to the authentication switch state. In the fourth embodiment, the connection section 2 is designed to designate the changeover of the power amplification level to the power amplifier 4, in connection with the authentication switch state.

The power amplifier 4 is an apparatus for power amplifying transmission signal generated in the data processing section 8, and modulated in the modulation section 5. The power amplifier 4 has a function to detect the operation to the switch, when the connection section 3 functions as authentication switch (fourth embodiment), and to lower the power amplification lever to a predetermined value in connection with this detection.

The modulation section 5 modulates transmission data from the data processing section 8 into a transmission signal appropriate for radio communication, and outputs to the power amplifier 4.

The amplifier 6 amplifies reception signal received by the antenna section 1 and passed through the connection section 3 and the branching filter 2, and outputs to the demodulation section 7.

The demodulation section 7, corresponding to the modulation method of the modulation section 5, demodulates reception signal amplified by the amplifier 6 and demodulated, generates and outputs reception signal in a format that can be processed by the data processing section 8.

The data processing section 8 generates transmission data, and processes reception data demodulated by the demodulation section 7 under the control of the control section 9.

The control section 9 is an apparatus for controlling the whole apparatus according to an inner program and, in the first embodiment, performs the authentication processing between another radio communication apparatus (other party apparatus) existing in a range where the radio communication is possible, for instance, when the antenna 1 is disconnected by the connection section 3, before starting at least the data communication. In the second and third embodiment, the control section 9 performs the authentication processing with another radio communication apparatus, when the antenna section 1 and the communication circuit (branching filter 2, control section 9) are disconnected by the connection section 3 functioning as authentication switch. In addition, the control section 9 controls the indication of the display section 10 and the sound output of the speaker section 11 according to the processing executed in response to the data communication executed after the authentication processing.

<First Embodiment>

Next, a radio communication apparatus in a first embodiment of the present invention will be described.

Figure 3:
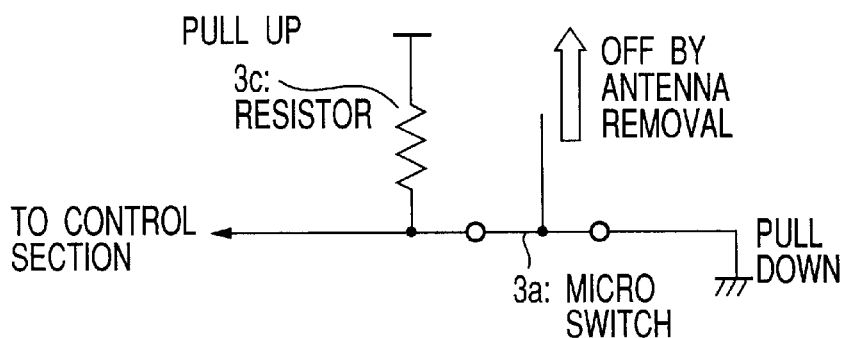
FIG. 3 is a circuit diagram showing the outline of the circuit configuration of the connection section 3 in the first embodiment.

FIG. 2 shows an external view of an antenna section 1 and a connection section 3 in the first embodiment; and FIG. 3 is a circuit diagram showing the outline of the circuit configuration of the connection section 3 in the first embodiment.

As shown in FIG. 2, the antenna section 1 is composed detachably from the apparatus case. The antenna section 1 is composed of an antenna 1a and a connector 1b electrically connected to this antenna 1a, while the connection section 3 is composed of a micro switch 3a connected to the control section 9 and a connector receptacle side 3b to which the connector 1b of the antenna section 1 can be fitted. The connector receptacle side 3b is electrically connected to the branching filter 2. A protuberance of the micro switch 3a protrudes outside the case, and is press fitted by the contact surface between the connector receptacle side 3b and the case when the connector 1b is bound with the connector receptacle side 3b. The antenna section 1 is electrically connected by binding the connector 1b to the connector receptacle side 3b of the connection section 3. When the connector 1b is bound to the connector receptacle side 3b, the connector 1b is press fitted to the protuberance of the micro switch 3a, and the micro switch 3a will be put ON. Otherwise, when the connector 1b is detached from the connector receptacle side 3b, the micro switch 3a will be put OFF.

Namely, as shown in FIG. 3, when the micro switch 3a is turned ON (when the antenna section 1 is fitted), the signal level to the control section 9 is pulled down (LOW level), and when the micro switch 3a is turned OFF, the signal level to the control section 9 will be pulled up by a resistor 3c (HIGH level). Consequently, the control section 9 can detects if the antenna section 1 is attached to or detached from the apparatus, by the signal level from the connection section 3 (micro switch 3a).

Figure 4:
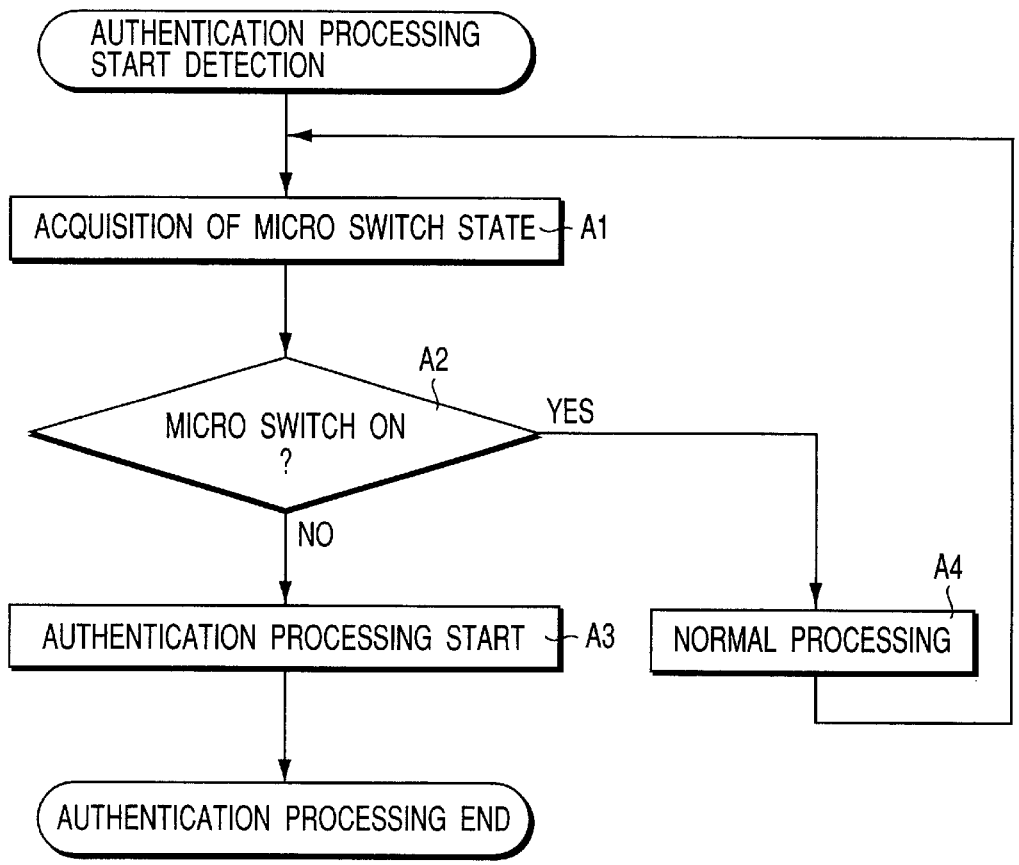
FIG. 4 is a flow chart illustrating the operation of the radio communication apparatus in the first embodiment.

Next, the operation of the radio communication apparatus in the first embodiment will be described referring to the flow chart of FIG. 4.

The control section 9 detects the generation of status change of the micro switch 3a by interruption or others, and reads the state of the micro switch 3a at this timing (step A1).

In the normal state of use, as the antenna section 1 is connected with the apparatus (connection section 3), the micro switch 3a is turned ON, and the signal from the connection section 3 to the control section 9 is in LOW level. When the control section 9 detects that the signal from the connection section 3 is in LOW level, and that the micro switch 3a is turned ON, it performs the normal processing (step A2, A4). In other words, it performs data communication or the like using the antenna section 1 connected to the apparatus. The connection of the antenna section 1 allows a stable communication within the intrinsic radio communication range.

On the other hand, if data communication is to be performed through the authentication processing only with a specific other apparatus by means of radio communication apparatus, the user detaches previously the antenna section 1 from the connection section 3 (connector receptacle side 3b). The micro switch 3a is put OFF by this, and the signal level to the control section 9 changes into HIGH level. When the control section 9 detects that the signal from the connection section 3 is in HIGH level, and that the micro switch 3a is turned OFF, it transits to the authentication processing mode and starts the authentication processing (step A2, A3).

In other words, the control section 9 starts the authentication processing in connection with the detachment of the antenna section 1, and the antenna section 1 is already removed when the authentication processing is started. This attenuates considerably electric wave release and reception efficiency during the authentication processing, allowing to limit communicable area. Therefore, authentication information transmitted/received in the authentication processing is received only by apparatuses existing in a limited area, reducing the risk of interception of authentication information by unspecified apparatuses.

Figure 5:
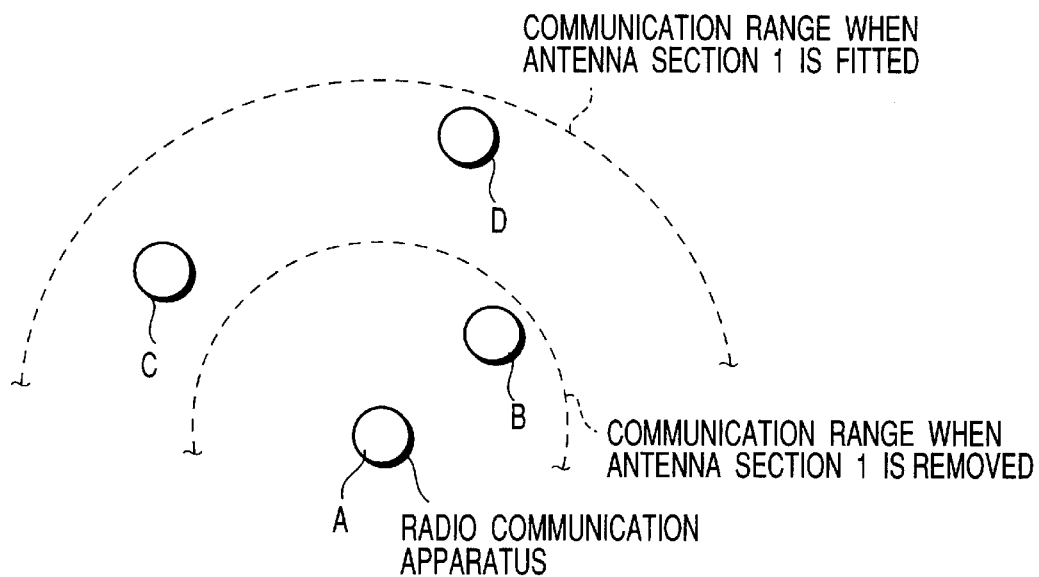
FIG. 5 shows a situation where a radio communication apparatus A performs the authentication processing only with a radio communication apparatus B as the other party apparatus.

FIG. 5 shows a situation where a radio communication apparatus A performs the authentication processing only with a radio communication apparatus B as specific other apparatus. When the antenna section 1 is connected, as radio communication apparatuses B, C, D are included in the communication range of the radio communication apparatus A, the radio communication apparatuses C and D may receive the authentication information, if the authentication processing is performed in this state. There, if the antenna section 1 is detached and the authentication processing starts with a limited communication area, the authentication information will be received only by the radio communication apparatus B which is the specific other apparatus.

Thus, electric wave release and reception efficiency can be attenuated considerably, and the authentication information is prevented from arriving at an unspecified other party, only by a simple operation of detaching the antenna section 1, without installing an additional circuit such as control circuit for radio output control; therefore, the authentication processing can be performed only with a specific other party apparatus existing in a limited range.

<Second Embodiment>

Next, a radio communication apparatus in a second embodiment of the present invention will be described.

Figure 6:
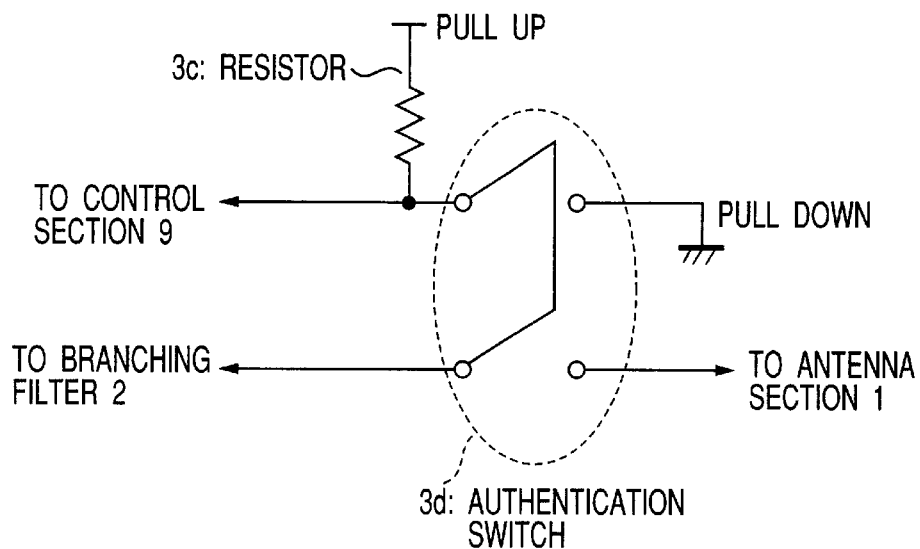
FIG. 6 is a circuit diagram showing the outline of the circuit configuration of the connection section 3 in a second embodiment.

FIG. 6 is a circuit diagram showing the outline of the circuit configuration of the connection section 3 in the second embodiment.

The connection section 3 of the second embodiment is composed as a switch (authentication switch 3d) to be operated to designate the execution of authentication processing, as shown in FIG. 6, and in composed to change over connection and disconnection of the antenna section 1 and the communication circuit (branching filter 2, control section 9).

Namely, when the authentication switch 3d is turned ON, the signal level to the control section 9 is pulled down (LOW level) and the branching filter 2 and the antenna section 1 are connected, and when the authentication switch 3d is turned OFF as shown in FIG. 6, the signal level to the control section 9 will be pulled up by a resistor 3c (HIGH level) and the branching filter 2 and the antenna section 1 are disconnected. Consequently, the control section 9 can detects if the branching filter 2 and antenna section 1 are connected or disconnected by the signal level from the connection section 3.

Next, the operation of the radio communication apparatus in the second embodiment will be described referring to the flow chart of FIG. 7. Here, in the radio communication apparatus of the second embodiment, the state of authentication switch 3d is supposed to be acquired at the timing of change over operation to the authentication switch 3d, and the processing of the step B0 will not be performed (the step B0 will be performed in the third embodiment).

The control section 9 detects the generation of status change of the authentication switch 3d by interruption or others, and reads the state of the authentication switch 3d at this timing (step B1).

In the normal state of use, the authentication switch 3d is turned ON, and the signal from the connection section 3 to the control section 9 is in LOW level. In addition, the branching filter 2 and the antenna section 1 are connected. When the control section 9 detects that the signal from the connection section 3 is in LOW level, and that the authentication switch 3d is turned ON, it performs the normal processing (step B2, B4). In other words, it performs data communication or the like using the antenna section 1 connected to the branching filter 2. The connection of the antenna section 1 allows a stable communication within the intrinsic radio communication range.

On the other hand, if data communication is to be performed through the authentication processing only with a specific other apparatus by means of radio communication apparatus, the user turns OFF the authentication switch 3d. Thus, as shown in FIG. 6, the authentication switch 3d is put OFF by this, and the signal level to the control section 9 changes into HIGH level. When the control section 9 detects that the signal from the connection section 3 is in HIGH level, it transits to the authentication processing mode and starts the authentication processing (step B2, B3).

In other words, the control section 9 starts the authentication processing in connection with the detachment of the branching filter 2 from the antenna section 1, and the antenna section 1 is already removed when the authentication processing is started. This attenuates considerably electric wave release and reception efficiency during the authentication processing, allowing to limit communicable area. Therefore, authentication information transmitted/received in the authentication processing is received only be apparatuses existing in a limited area, reducing the risk of interception of authentication information by unspecified apparatuses. The second embodiment also, as shown in FIG. 5, allows to perform the authentication processing only with a radio communication apparatus B as specific other apparatus.

Thus, the authentication processing can be performed only with a specific other party apparatus, only by a simple operation of switching over the authentication switch 3d provided at the connection section 3, without installing an additional circuit such as control circuit for radio output control.

<Third Embodiment>

Next, a radio communication apparatus in a third embodiment of the present invention will be described. In the third embodiment, the radio communication apparatus is composed similarly as in the second embodiment; however, the state of connection section 3 (authentication switch 3d) is not obtained at the timing of switching over operation, but is executed at a predetermined timing set previously. Namely, the radio communication apparatus of the third embodiment performs the processing including the step B0, according to the flow chart shown in FIG. 7.

The control section 9 monitors a predetermined timing set previously, for instance, when entering a certain time set previously, after the main power supply of radio communication apparatus is turned ON, when optional connection is made to the radio communication apparatus, or the like. The control section 9 reads the switch state of the connection section 3 (authentication switch 3d) at a predetermined timing (step B0, B1).

Figure 7:
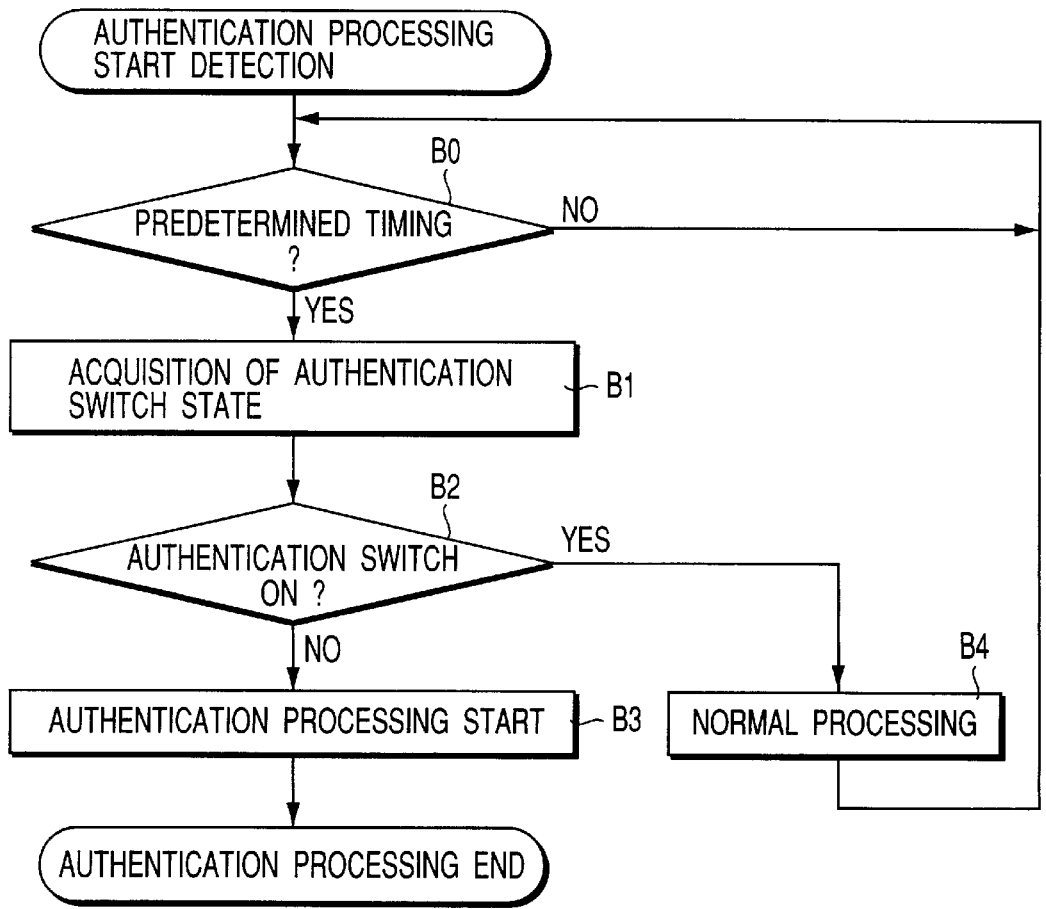
FIG. 7 is a flow chart illustrating the operation of the radio communication apparatus in the second and third embodiment.

Thereafter, the detailed description will be omitted, as the processing in response to the state of authentication switch 3d is performed according to the flow chart shown in FIG. 7, similarly as in the second embodiment (step B2 to B4).

In the radio communication apparatus in a third embodiment, to perform the authentication processing, the user changes over beforehand the authentication switch 3d to the side of authentication processing execution, namely to OFF side. This allows to execute the authentication processing at a predetermined timing.

Thus, the authentication processing can be performed only with a specific other party apparatus, only by a simple operation of switching over previously the authentication switch 3d provided at the connection section 3, without installing an additional circuit such as control circuit for radio output control and further, as the authentication switch 3d state is obtained only at a certain timing, unnecessary execution of authentication processing can be prevented, when the authentication processing is executed in a certain situation.

Here, the authentication processing start detection processing as in the third embodiment can be applied not only to the configuration of the second embodiment, but also to the radio communication apparatus in the first embodiment.

<Fourth Embodiment>

Next, a radio communication apparatus in a fourth embodiment of the present invention will be described.

The connection section 3 of the fourth embodiment is composed as authentication switch 3d to be operated to designate the execution of authentication processing.

When the authentication switch 3d is turned ON, the signal level to the control section 9 is pulled down (LOW level), and when the authentication switch 3d is turned OFF, the signal level to the control section 9 will be pulled up by a resistor 3c (HIGH level) (refer to FIG. 3 and FIG. 6). In addition, the power amplifier 4 can detect the operation to the authentication switch, namely ON/OFF state.

The control section 9 obtains the state of the authentication switch 3d as in the aforementioned second and third embodiments, starts the authentication processing according to the state of this authentication switch 3d (when the authentication switch is OFF), or executes the normal processing (when the authentication switch is ON) (refer to FIG. 7).

Figure 8:
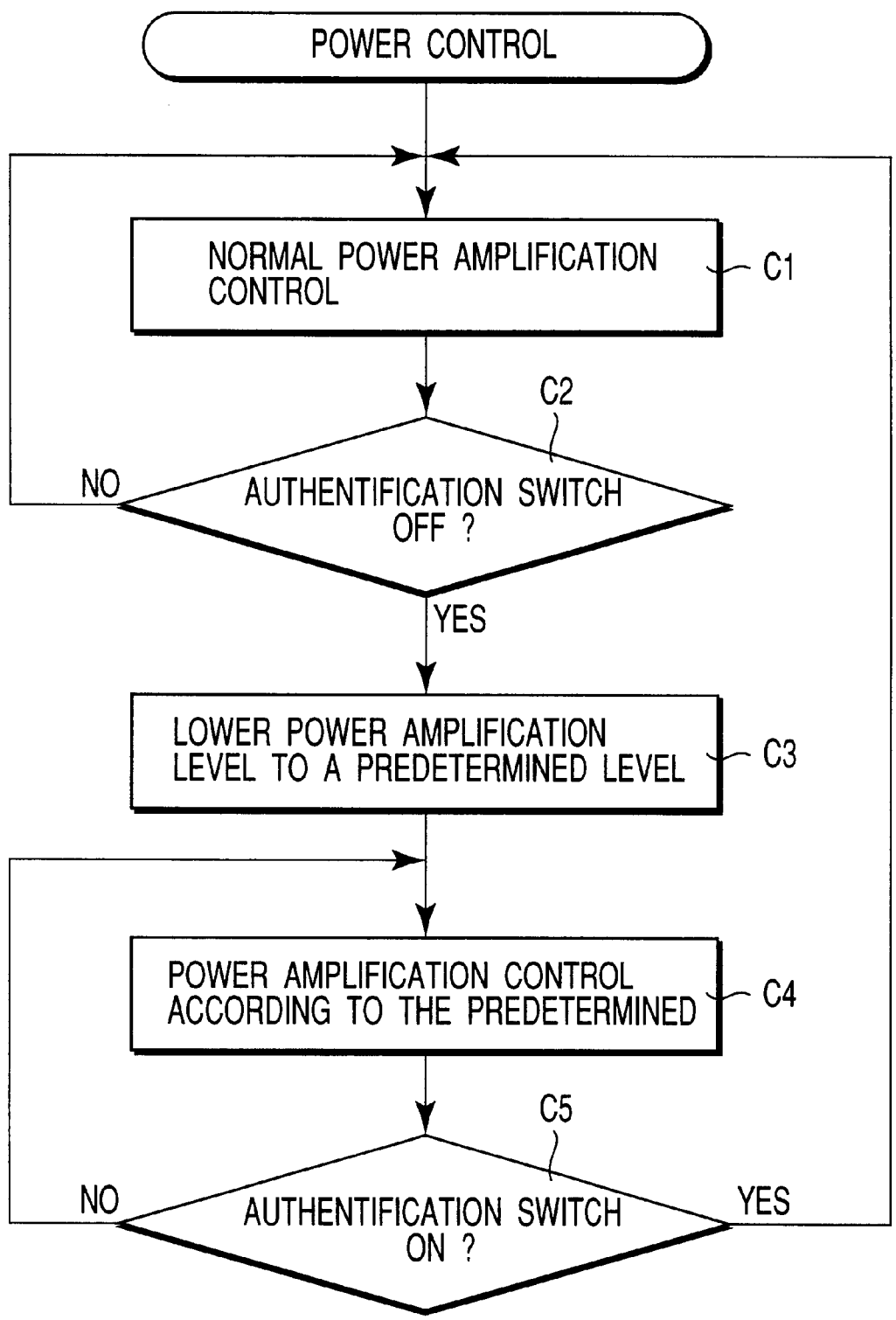
FIG. 8 is a flow chart showing the power control of a power amplifier 4 in a fourth embodiment.

On the other hand, the power amplifier 4 performs the power control in connection with the operation to the authentication switch. FIG. 8 is a flow chart showing the power control of a power amplifier 4.

The power amplifier 4 performs the normal power amplification control when the authentication switch is ON (step C). In other words, the transmission signal modulated by the modulation section 5 is power amplified, so that electric wave reaches apparatuses existing in the normal communicable area.

Here, if the authentication switch is operated to be OFF, the power amplifier 4 detects the authentication switch OFF state (step C2) and lowers the power amplification level to a predetermined level set previously (step C3). The previously set power amplification level is, for instance, a level at which the electric wave attains only to the radio communication apparatus B, when the radio communication apparatus A in FIG. 5 can transmit electric wave to radio communication apparatuses B, C and D by a normal power amplification control. In other words, the radio communication output level is lowered to the same level as in the case when the antenna section 1 is disconnected from the communication circuit in the aforementioned first to third embodiments.

The power amplifier 4 performs the power amplification control according to the predetermined level lowered in connected to the authentication switch (step C4). Here, a precise power amplification control is not performed, but the output level is lowered simply to a predetermined set previously. Consequently, an additional circuit that will increase considerably the cost of the power amplifier 4 is unnecessary.

Here, the control section 9 starts the authentication processing when the authentication switch is switched OFF. Namely, the authentication processing begins when the power amplification level is lower by the power amplifier 4, and the electric wave range is limited, and authentication information transmitted/received in the authentication processing is received only by apparatuses existing in a limited area, reducing the risk of interception of authentication information by unspecified apparatuses. In the fourth embodiment, as shown in FIG. 5, the authentication processing can be performed only with the radio communication apparatus B as the other party apparatus, by operating the authentication switch.

On the other hand, if the authentication switch is switched ON during the power amplification control to lower the output level to a predetermined level, the power amplifier 4 transits to the normal power amplification control and amplifies the power so that electric wave attains the normal communicable area (step C1).

Thus, the authentication processing can be performed only with a specific other party apparatus through a simple operation of authentication switch changeover, by lowering the power amplification level of the power amplifier 4 to a predetermined level so as to limit the communicable area, in connection with the changeover of the authentication switch operated to command the authentication processing start.

In the foregoing description of the fourth embodiment, though the signal amplification level by the power amplifier 4 is lowered to a predetermined level in connection of switching OFF of the authentication switch, the amplification level of not only the power amplifier 4 but also the amplifier 6 may be lower at the same time to a predetermined level.

In addition, though in the foregoing description of respective embodiments, the authentication processing is performed before the data communication start, obviously, it can be performed at the other timing.

Besides, the authentication processing start detection technique described for the aforementioned embodiment, can be written in a recording medium such as magnetic disk (floppy disk, hard disk, or the like), optical disk (CD-ROM, DVD, or the like) or semi-conductor memory as a computer executable program and supplied to various apparatus. Also, it can be supplied to various apparatus by transferring through a communication medium. The computer for executing the present apparatus reads the program recorded in a recording medium, or receives program via communication medium, and performs the aforementioned processing by controlling the operation by this program.

As mentioned in detail above, according to the present invention, the authentication processing can be performed easily only with a specific other party apparatus and the leak of authentication information can be prevented, by detaching the antenna section from the apparatus, disconnecting the antenna section from the communication circuit or starting the authentication processing in connection with the electric wave output lever lowering, without increasing the cost.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A radio communication apparatus for performing an authentication processing with another apparatus via radio communication, comprising:

an antenna detachably fitted to the communication apparatus;

a connection section configured to detect a detachment of said antenna; and a control section configured to perform the authentication processing upon the detection of detachment of said antenna by said connection section.

2. A radio communication apparatus for performing an authentication processing with another apparatus via radio communication, comprising:

a radio communication antenna;

a communication circuit;

a switch for switching over connection and disconnection between said radio communication antenna and said communication circuit; and a control section configured to detect the disconnection between said radio communication antenna and said communication circuit by said switch, and perform the authentication processing in connection with said disconnection.

3. A radio communication apparatus for performing an authentication processing with another apparatus via radio communication, comprising:

a radio communication antenna;

a communication circuit;

a switch configured to switch over connection and disconnection between said radio communication antenna and said communication circuit;

a connection section configured to detect connection or disconnection between said radio communication antenna and said communication circuit by said switch at a predetermined timing; and a control section configured to perform the authentication processing upon the detection by said connection section of a disconnection between said radio communication antenna and said communication circuit by said switch.

4. A radio communication method for establishing a network by performing an authentication processing with an apparatus via radio communication, comprising steps of:

detecting a disconnection of an antenna installed detachably to the apparatus; and performing the authentication processing, upon detecting a disconnection, for establishing the network with the apparatus.

* * * * *